United States Patent [19]
Syvrud

[11] Patent Number: 5,225,215
[45] Date of Patent: Jul. 6, 1993

[54] PLASTIC MOLDING APPARATUS

[76] Inventor: Daniel J. Syvrud, 1990 Scenic Ridge Dr., Chino Hills, Calif. 91709

[21] Appl. No.: 923,608

[22] Filed: Aug. 3, 1992

[51] Int. Cl.⁵ .................. B29C 45/36; B29C 45/42
[52] U.S. Cl. .................. 425/438; 425/441; 425/577; 249/63; 249/66.1
[58] Field of Search .......... 425/577, 552, 547, 438, 425/441, 443, 436 RM, 440, 392, 393; 249/66.1, 178, 183, 63, 154

[56] References Cited

U.S. PATENT DOCUMENTS

| | | | |
|---|---|---|---|
| 3,796,407 | 3/1974 | Brown | 249/63 |
| 3,827,926 | 8/1974 | Havstad | 249/63 |
| 4,050,667 | 9/1977 | Kossett | 249/177 |
| 4,243,620 | 1/1981 | Curetti et al. | 425/577 |
| 4,709,757 | 12/1987 | Bly | 425/577 |

FOREIGN PATENT DOCUMENTS

| | | | |
|---|---|---|---|
| 90043 | 11/1960 | Denmark | 249/183 |
| 46-12911 | 4/1971 | Japan | 425/577 |
| 46-24546 | 7/1971 | Japan | 425/577 |
| 53-127559 | 11/1978 | Japan | 425/577 |
| 275365 | 10/1970 | U.S.S.R. | 249/183 |

*Primary Examiner*—Jay H. Woo
*Assistant Examiner*—Khanh P. Nguyen
*Attorney, Agent, or Firm*—Jack C. Munro

[57] ABSTRACT

A plastic molding apparatus which produces the molded part on a centrally located core with this core being elongated and having a non-linear, longitudinal, center axis. The core is removed from the molded part by being pulled directly from the molded part which causes the molded part to assume a temporarily deformed shape with the molded part then springing back into its molded shape after removal of the core.

4 Claims, 4 Drawing Sheets

PLASTIC MOLDING APPARATUS

BACKGROUND OF THE INVENTION

1) Field of the Invention

The field of this invention relates to molding equipment and more particularly to a novel molding apparatus which is used to disengage an elongated arcuate molded part from a core on which the part is formed.

2) Description of Prior Art

To manufacture tubes and pipes, plastic has long been used. If the tube or pipe is straight, it has been known to construct such with a metallic core located in the mold cavity with this metallic core forming the through elongated opening of the pipe or tube. Once the molded part is formed on the core within the mold, the mold is opened, the core disengaged from the mold cavity and the core merely pulled free of the molded part. This type of molding technique has long proved satisfactory for straight tubes and pipes.

However, if the tube or pipe is other than straight, that is, has a bend, the extraction of the core will cause deforming of the molded part and such deforming was thought to cause the molded part to assume a shape other than the desired shape. Therefore, another technique was used in the past in order to produce molded parts that have an elongated, non-lineal axis.

Normally, the molding technique for such non-lineal parts is to produce the molded part in two separate pieces. These pieces are then merely separated from the core of the mold with this separation occurring transversely as opposed to longitudinally. The two separate parts that are to make up the molded part are then to be glued or otherwise welded together forming the part. Because the molded part in this instance is formed of two separate parts which are secured together, the cost of making this molded part is significantly greater than when the molded part is made as a complete unit and is merely stripped from the core.

SUMMARY OF THE INVENTION

The molding apparatus of the present invention utilizes two halves which when placed together in an abutting relationship forms a mold cavity with this mold cavity defining an elongated, non-lineal configuration. Placed within the mold cavity is a core with a space being formed between the core and the wall of the mold cavity. It is within this space that heated liquid plastic is injected under pressure completely filling the mold cavity and, upon being cooled sufficiently, forms the desired molded part. The two halves of the mold are separated with the core and the molded part formed thereon being moved to a spaced position from the mold cavity. The core is connected to a hydraulic actuator which then causes the core to move to a retracted position. Because the molded part is non-lineal, the molded part will become distorted during this removal. As the core is retracted, the end of the molded part abuts against a stripping block. This stripping block constantly maintains a flush condition against the end of the molded part with this occurring by permitting the stripping block to both pivot and move lineally on a guide track during retraction of the core. When the molded part is removed from the core, the molded part will automatically "spring" back to its molded configuration.

The primary objective of the present invention is to construct an apparatus which produces plastic pipes or tubes more efficiently and therefore less expensive than previous techniques for producing such pipes or tubes.

Another objective of the present invention is to construct an elongated, non-lineal, molded part which requires no assembly after molding of the part.

DETAILED DESCRIPTION OF THE SHOWN EMBODIMENT

Figures 1, 4:
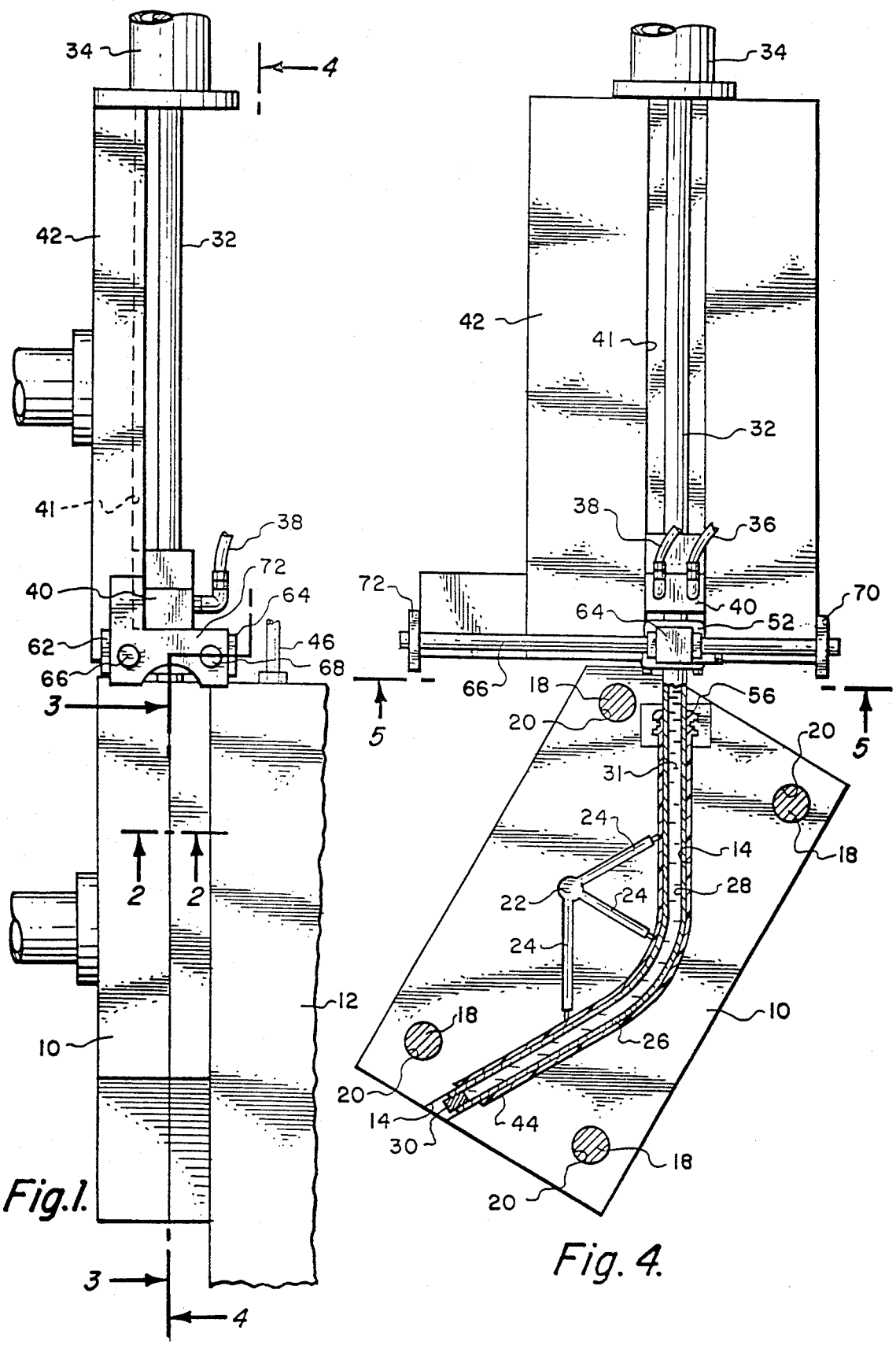
FIG. 1 is a side elevational view of the molding apparatus of the present invention showing the mold closed.
FIG. 4 is a longitudinal, cross-sectional view through the two halve mold included within the molding apparatus of the present invention taken along line 4—4 of FIG. 1 and in a direction opposite to the view of FIG. 3 and also showing the front view of the actuator arrangement used to extract the core from the molded part.
Figure 2:
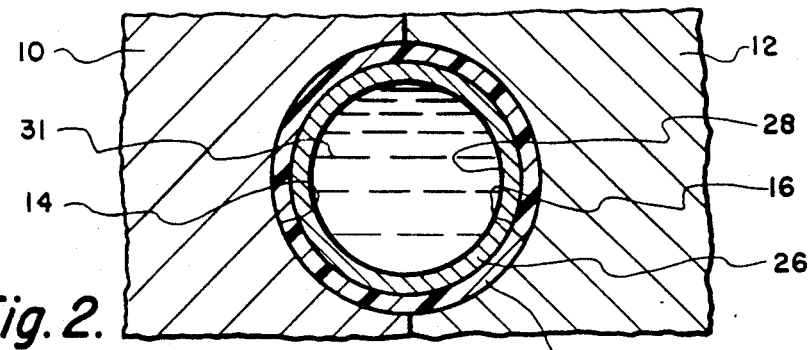
FIG. 2 is a cross sectional view through the molding cavity of the molding apparatus of the present invention taken along line 2—2 of FIG. 1.
Figure 3:
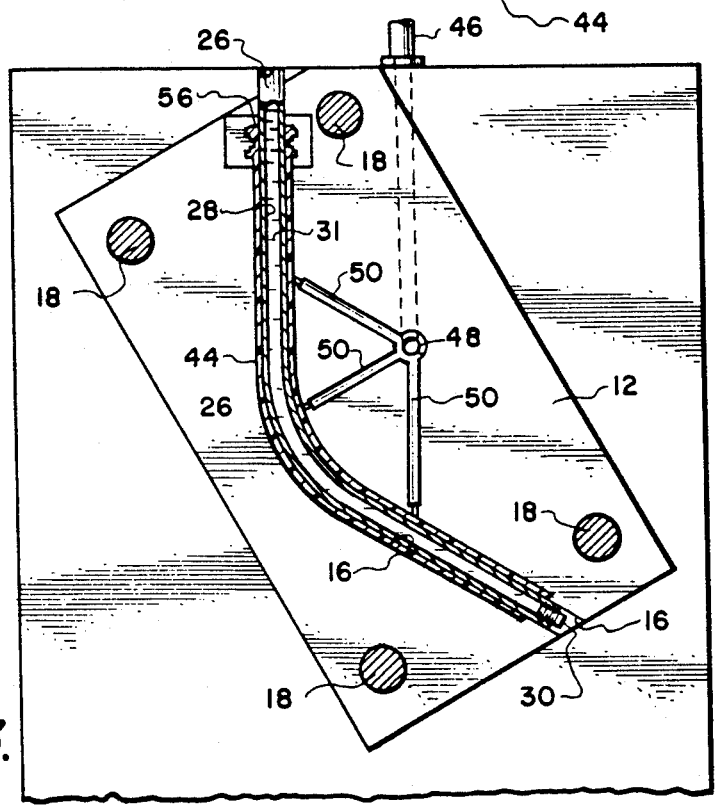
FIG. 3 is a longitudinal, cross sectional view taken through the mold cavity of the molding apparatus of the present invention taken along line 3—3 of FIG. 1.
Figure 5:
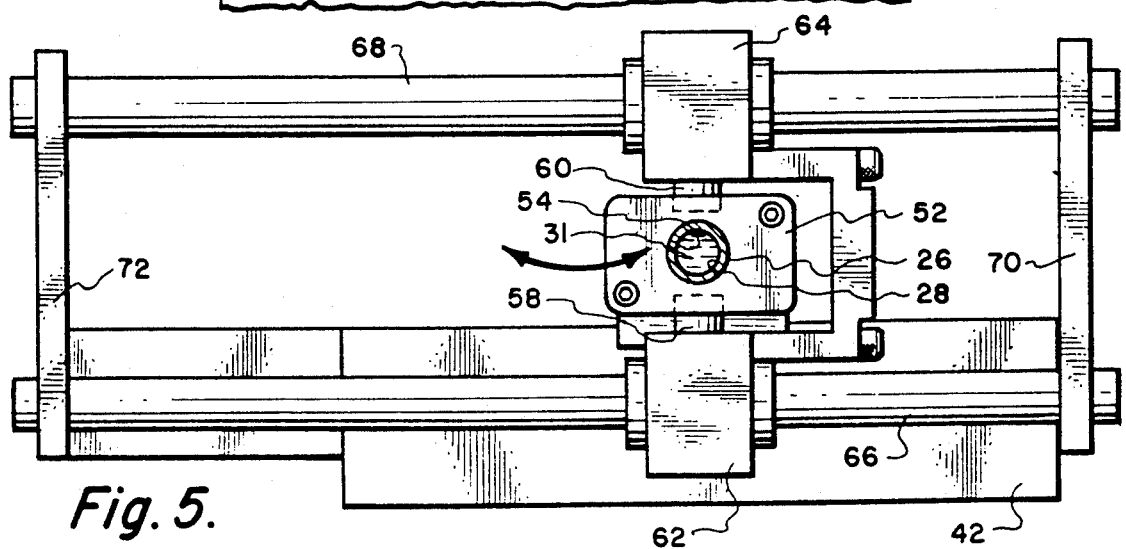
FIG. 5 is an end view of the molding apparatus of the present invention showing the core in cross-section taken along line 5—5 of FIG. 4.

Referring particularly to the drawings, there is shown in FIG. 1 a mold composed of a first half 10 and a second half 12. Half 10 has machined therein a first cavity 14 of a mold. Second half 12 has machined therein a second cavity 16 which constitutes the remaining one half of the mold. The first half 10 is fixed in position. Second half 12 has mounted on the surface on which the cavity 16 is formed (the molding surface), a plurality of aligning pins 18. Each pin 18 fits in a close fitting manner within a recess 20 formed within the molding surface of first half 10. Liquid heated plastic is to be supplied under pressure into port 22 which is formed within the first half 10. This liquid plastic from port 22 is conducted through sprue passages 24 to be injected within the mold cavity defined by combined cavities 14 and 16 to produce molded part 44.

Located within the molding cavity is an elongated, non-lineal arcuate core 26. The core 26 is to be located within the mold cavity in a spaced apart manner so that there is even spacing around the core 26 relative to the wall surface of the cavity sections 14 and 16. Typically, this spacing would be about a three thirty seconds of an inch. The core 26 is to be hollow forming an internal chamber 28 within which cooling water 31 is to be conducted. Internal chamber 28 is closed at the outer end of the core 26 by means of a plug 30.

Figure 6:
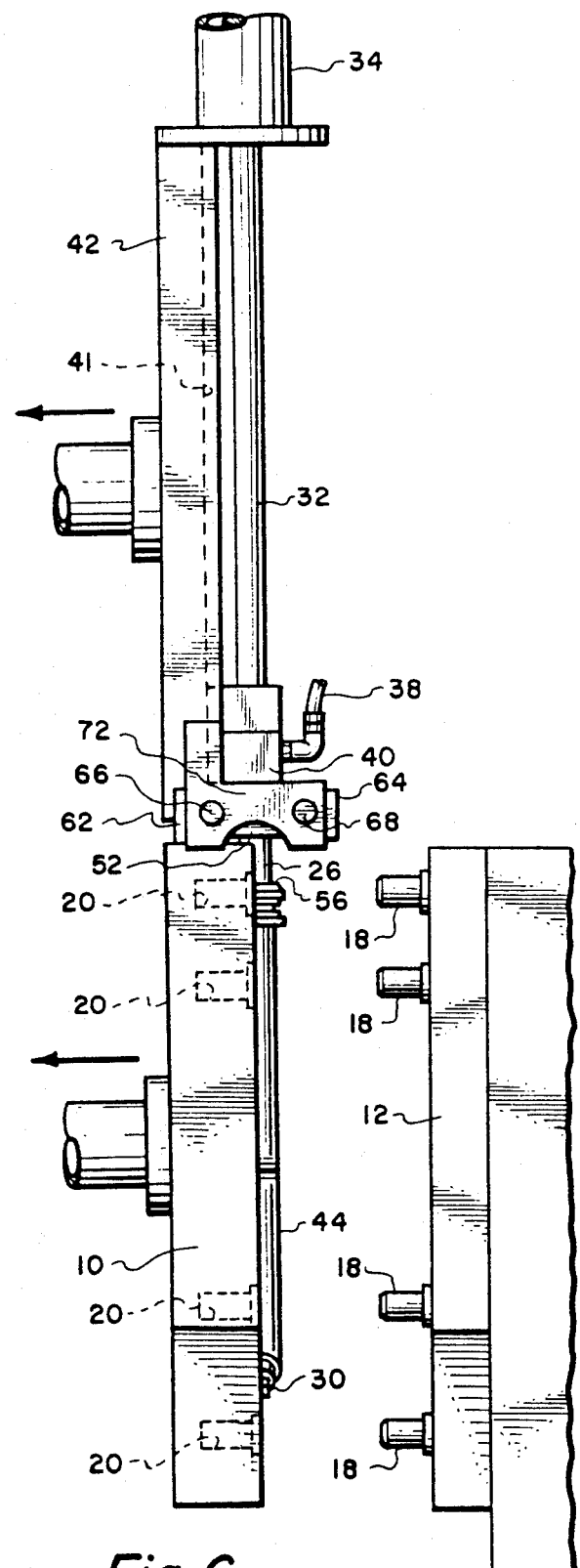
FIG. 6 is a view similar to FIG. 1 but showing the mold in an open state.

The second half 12 of the mold is to be movable from a closed position shown in FIG. 1 to the open position shown in FIG. 6. When in the closed position, each pin 18 will align within a recess 20. The pins 18 and the recesses 20 will insure that when the molding halves 10 and 12 are connected together that the two half cavities 14 and 16 will align precisely together. The mold half 12 is to be mounted on an actuator arrangement (not shown) which causes the movement of the mold half 12 relative to the mold half 10.

The core 26 is fixedly secured to the outer end of an actuator rod 32. The actuator rod 32 to be lineally driven from a hydraulic cylinder 34. Cooling water 31 is supplied by line 38 into internal chamber 28. Water from chamber 28 is removed through line 36. The lines 36 and 38 are mounted on an actuator block 40 which is carried by the rod 32. The actuator block 40 rides in channel 41 formed within housing 42. The movement of the hydraulic cylinder 34 is deemed to be conventional and forms no specific part of this invention.

The actuator rod 32, hydraulic cylinder 34 and block 40 are mounted on housing 42. Housing 42 is to be movable a short distance relative to mold half 10 so that the core 26 can be moved from a position located within the mold cavity 14 to a position spaced slightly therefrom as is clearly shown in FIG. 7 of the drawings.

The liquid plastic that enters through sprue 24 into and around the core 26 is to produce the molded part 44. The liquid plastic supplied in the port 22 is supplied from conduit 46 which also connects with injection port 48 formed within the second half 12. From the injection port 48, the liquid plastic is conducted through sprue passages 50 into the mold cavity. The ports 22 and 48 will normally be in alignment as well as passages 24 and 50.

The core 26 is mounted in a close conforming manner within a through hole 54 of a stripping block 52. This stripping block 52 is part of a stripping block apparatus. This stripping block 52 is to abut, in a constantly flush manner, against the inner end 56 of the molded part 44 during the time that the molded part 44 is being removed from the core 26. Because the core 26 is not straight, the block 52 will have to move to different positions in order to be maintained flush against end 56 during the removal of the molded part 44 from the core 26. This movement is accomplished by the stripping block 52 being mounted for pivoting movement on mounting pins 58 and 60. Pin 58 is fixedly mounted on first guide block 62 with pin 60 being fixedly mounted on a second guide block 64. First guide block 62 is mounted for lineal movement on a guide rod 66. In a similar manner, the second guide block 64 is mounted for lineal movement on a guide rod 68. Guide rods 66 and 68 are located in a parallel, spaced apart, arrangement with one end of the guide rods 66 and 68 being fixedly mounted to a mounting plate 70 and the opposite ends of the guide rods 66 and 68 being fixedly mounted to a mounting plate 72.

The operation of the molding apparatus of this invention is as follows: When the mold halves 10 and 12 are located closed as shown in FIG. 1, the core 26 is located within the mold cavity created by cavities 14 and 16. Heated liquid plastic is supplied through conduit 46 within ports 22 and 48 and through passages 24 and 50 into the mold cavity surrounding the core 26. When this cavity is completely filled, cooling water is conducted to within the internal chamber 28 which functions to rapidly cool the molded part 44.

Figure 7:
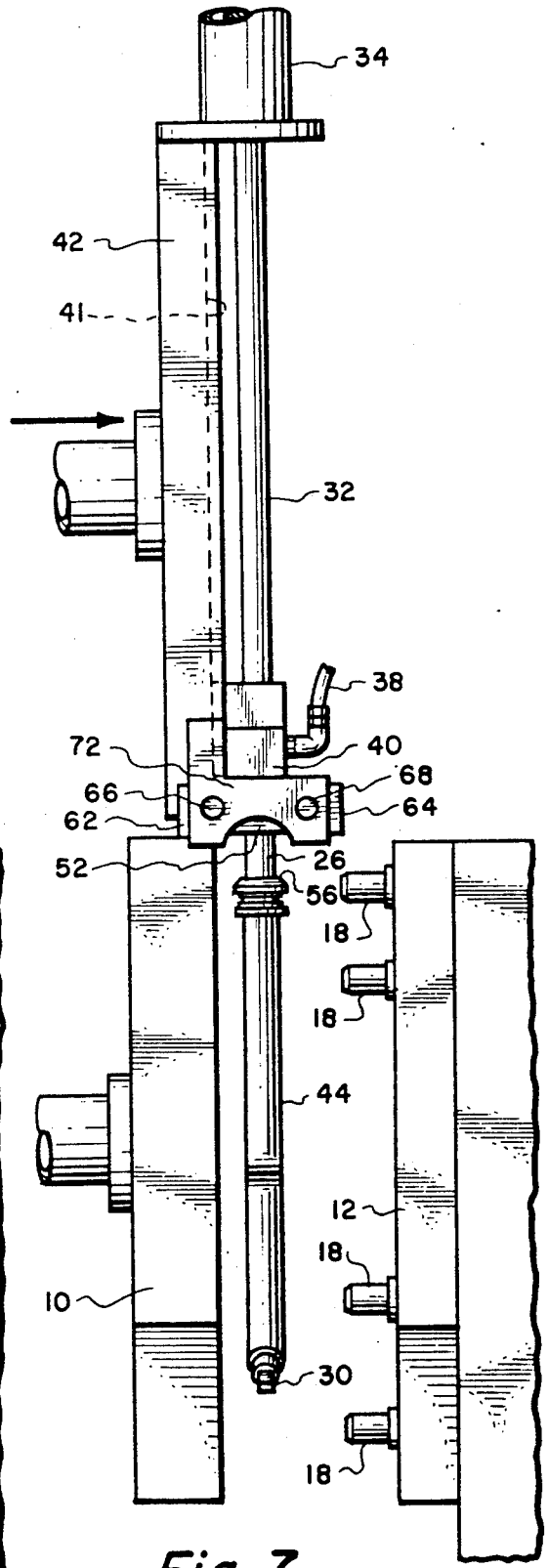
FIG. 7 is a view similar to FIG. 6 but showing the core and the now molded part moved to a spaced condition from the mold cavity.
Figure 8:
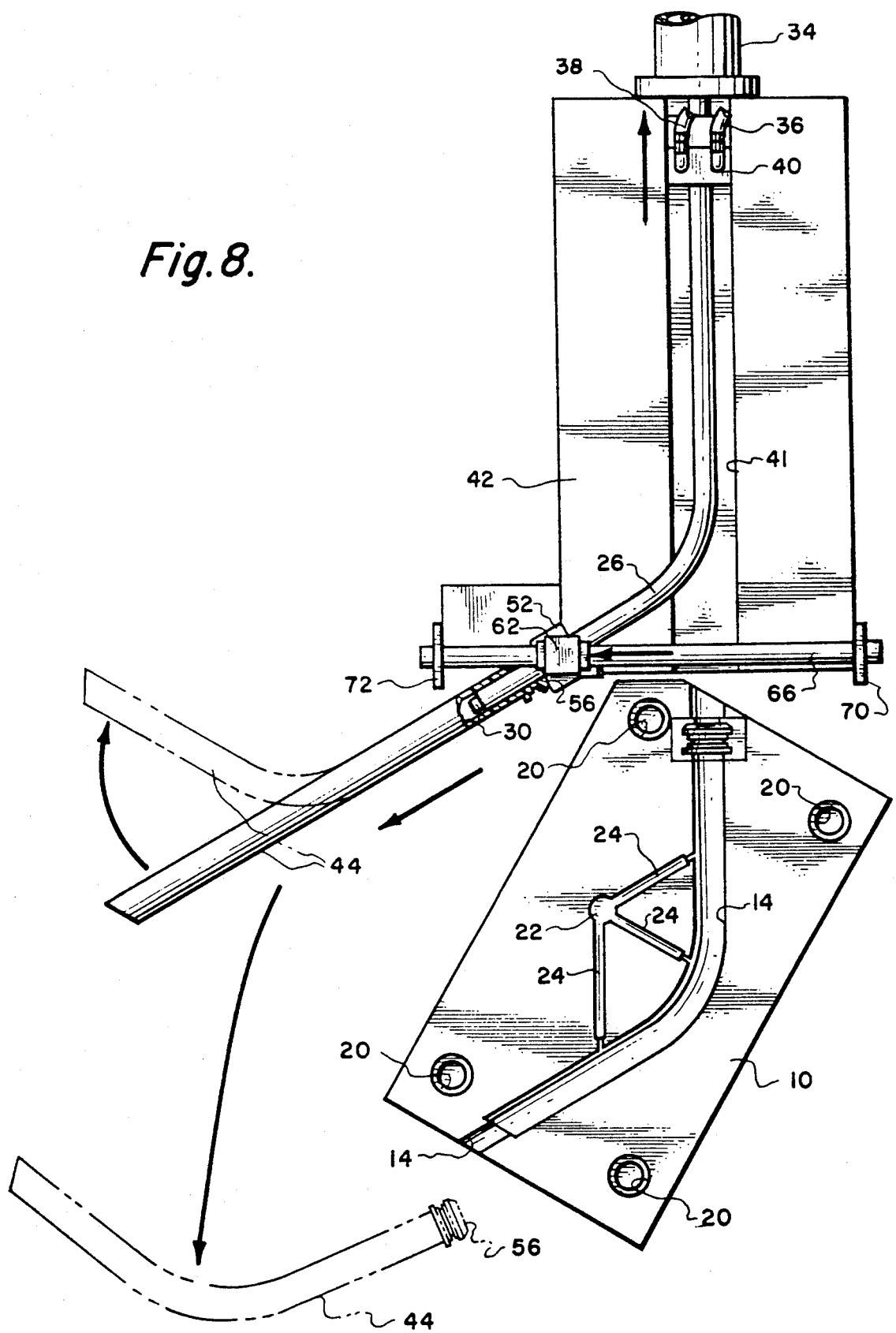
FIG. 8 is a front view of the molding apparatus depicting more clearly the extraction process of the molded part from the core.

When the molded part 44 has now assumed a somewhat cooled state, the mold half 12 is moved away from mold half 10 as is shown in FIG. 6 of the drawings. Housing 42 is then moved toward mold half 12 a small distance until the core 26 and the molded part 44 is disengaged from the mold cavity 14. This position is shown in FIG. 7 of the drawings. The actuator 34 is then activated which causes actuator shaft 32 to move the core 26 in a direction toward the housing 42. After a short distance, approximately an inch to two inches, the end 56 of the molded part 44 will into contact with the block 52. As the movement of the shaft 32 continues, the molded part 44 remains located against the block 52 with the core 26 continuing to move. Immediately, the molded part 44 will begin to deform to some shape other than the molded configuration. Actually, the molded part 44 will begin to bend and then will straighten out as the movement continues. During this bending and straightening out, the mold block 52 will move lineally on the rods 66 and 68 from the position shown in FIG. 4 of the drawings, when the core 26 is in the extended position, to the position shown in FIG. 8 of the drawings, when the core 26 is in the retracted position. As the stripping block 52 slides on the rods 66 and 68, the stripping block 52 also pivots about pins 58 and 60. The amount of pivoting of the block 52 is approximately forty five degrees when comparing FIG. 4 with FIG. 8. Eventually, the core 26 will be completely extracted from the molded part 44 at which time the molded part 44 will fall free from the core 26. At this particular time, the molding cycle can again be repeated with another molded part 44 to be then produced.

What is claimed is:

1. A plastic molding apparatus for forming of arcuate shaped parts, said apparatus comprising:
   a core having a longitudinal center axis, said longitudinal center axis being arcuate, a molded part capable of being formed in a close fitting manner on said core;
   a stripping block assembly, said core being attached to said stripping block assembly, said core being movable relative to said stripping block assembly in a direction along said longitudinal center axis between an extended position and a retracted position, with said core in said extended position the molded part being formable on said core;
   actuator means connected to said core, said actuator means for moving said core between said retracted position and said extended position, during movement of said core from said extended position to said retracted position the molded part is to be removed from said core with the molded part assuming a deformed shape during removal and then returning to its formed shape after removal from said core; and
   said stripping block assembly including a stripping block, said core being movable in a close fitting manner through said stripping block, said stripping block to abut against an end of the molded part, said stripping block being movable lineally on a guide track as said core is moved between said extended position and said extracted position.

2. The plastic molding apparatus as defined in claim 1 wherein:
   said stripping block being pivotable relative to said guide track to keep said stripping block in flush contact with the aforementioned end of the molded part during movement of said core between said extended position and said retracted position.

3. The plastic molding apparatus as defined in claim 2 wherein:
   a two half separatable mold being utilized to form a molded part within a molding cavity, when said two-half separatable mold is closed said core being locatable within said molding cavity, when said two-half separatable mold is open said core being moved to a spaced position from the molding cavity.

4. The plastic molding apparatus as defined in claim 3 wherein:

said actuator means being hydraulic.

* * * * *